United States Patent [19]

Zeman et al.

[11] Patent Number: 5,536,352

[45] Date of Patent: Jul. 16, 1996

[54] METHODS OF MAKING CENTRIFUGALLY CAST PARTS

[75] Inventors: Robert E. Zeman, Webster; David R. Jackson, Rochester; William B. Vreeland, II, Webster, all of N.Y.

[73] Assignee: Eastman Kodak Company, Rochester, N.Y.

[21] Appl. No.: 338,933

[22] Filed: Nov. 14, 1994

[51] Int. Cl.$^6$ .................................................. B32B 31/12
[52] U.S. Cl. .......................... 156/242; 264/129; 264/135; 264/138; 264/265; 264/275; 264/311
[58] Field of Search ........................... 156/242; 264/311, 264/265, 275, 138, 129, 135; 29/895.23, 895.32; 355/277, 290; 492/25, 48, 59

[56] References Cited

U.S. PATENT DOCUMENTS

| | | | |
|---|---|---|---|
| 2,807,233 | 9/1957 | Fitch | 118/637 |
| 3,010,153 | 11/1961 | Bittner | 264/311 |
| 3,200,180 | 8/1965 | Russ et al. | 264/311 |
| 3,520,604 | 7/1970 | Shelffo | 355/16 |
| 3,697,171 | 10/1972 | Sullivan | 355/17 |
| 3,702,482 | 11/1972 | Dolcimascolo et al. | 346/74 |
| 3,781,105 | 12/1973 | Meagher | 355/3.96 |
| 3,893,761 | 7/1975 | Buchan et al. | 355/3 R |
| 3,923,392 | 12/1975 | Bachan et al. | 355/3 R |
| 3,959,574 | 5/1976 | Seanor et al. | 428/425 |
| 4,031,600 | 6/1977 | Whigham | 492/48 |
| 4,050,886 | 9/1977 | Moser | 355/290 |
| 4,068,937 | 1/1978 | Williemse et al. | 355/3 TR |
| 4,257,699 | 3/1981 | Lentz | 355/3 FU |
| 4,264,181 | 4/1981 | Lentz et al. | 355/3 FU |
| 4,394,340 | 7/1983 | Tarumi et al. | 264/311 |
| 4,430,406 | 2/1984 | Newkirk et al. | 430/99 |
| 4,453,820 | 6/1984 | Suzuki | 355/3 TR |
| 4,517,138 | 5/1985 | Rawlings et al. | 264/311 |
| 4,555,079 | 11/1985 | Miwa et al. | 355/3 TR |
| 4,729,925 | 3/1988 | Chen et al. | 428/425.8 |
| 4,742,941 | 5/1988 | Tastet | 222/309 |
| 4,810,564 | 3/1989 | Takahashi et al. | 428/213 |
| 4,853,737 | 8/1989 | Hartley et al. | 355/289 |
| 4,859,396 | 8/1989 | Krenkel et al. | 264/311 |
| 4,889,674 | 12/1989 | Krenkel et al. | 264/311 |
| 4,910,559 | 3/1990 | Kuge et al. | 355/285 |
| 5,011,739 | 4/1991 | Nielsen et al. | 428/425.8 |
| 5,035,950 | 7/1991 | Del Rosario | 428/421 |
| 5,084,735 | 1/1992 | Rimai et al. | 355/271 |
| 5,156,915 | 10/1992 | Wilson et al. | 428/425.8 |
| 5,187,526 | 2/1993 | Zaretsky | 355/273 |
| 5,200,284 | 4/1993 | Chen et al. | 430/33 |
| 5,212,032 | 5/1993 | Wilson et al. | 430/65 |
| 5,215,852 | 6/1993 | Kato et al. | 430/126 |
| 5,217,838 | 6/1993 | Wilson et al. | 430/126 |
| 5,250,357 | 10/1993 | Wilson et al. | 428/425.8 |
| 5,259,989 | 11/1993 | Schlueter, Jr. et al. | 252/500 |
| 5,259,990 | 11/1993 | Schlueter, Jr. et al. | 252/500 |
| 5,266,431 | 11/1993 | Mammino et al. | 430/96 |
| 5,383,834 | 1/1995 | Kanome et al. | 492/25 |

FOREIGN PATENT DOCUMENTS 61-202811  9/1986  Japan .

Primary Examiner—Michael W. Ball
Assistant Examiner—Richard Crispino
Attorney, Agent, or Firm—Anne B. Kiernan

[57] ABSTRACT

This invention provides the method of centrifugal casting consisting of the steps of: adding a polymeric material to a centrifugal apparatus; centrifuging said polymeric material until said polymeric material is cast; removing said cast polymeric material from said centrifugal apparatus; and mounting said cast polymeric material to an outside surface of a support, whereby the air interface side of said cast polymeric material is furthest from the outside surface of the support.

20 Claims, No Drawings

METHODS OF MAKING CENTRIFUGALLY CAST PARTS

FIELD OF THE INVENTION

This invention relates to methods of making parts coated with polymeric materials. Specifically, this invention relates to methods of making coated electrostatographic members, such as rollers and belts, in electrostatographic machines.

BACKGROUND OF THE INVENTION

In electrostatography an image comprising a pattern of electrostatic potential (also referred to as an electrostatic latent image) is formed on an insulative surface by any of various methods. For example, the electrostatic latent image may be formed electrophotographically (i.e., by imagewise radiation-induced discharge of a uniform potential previously formed on a surface of an electrophotographic element comprising at least a photoconductive layer and an electrically conductive substrate), or it may be formed by dielectric recording (i.e., by direct electrical formation of a pattern of electrostatic potential on a surface of a dielectric material). Typically, the electrostatic latent image is then developed into a toner image by contacting the latent image with an electrographic developer. The toner image is usually transferred from the element directly to a receiver such as paper, or to an intermediate transfer member, and from the intermediate transfer member to a receiver. Typically, the toner is fused to the receiver through pressurized contact with a heated fuser member.

In normal use, each of the surfaces onto which the toner is contacted must be smooth and of uniform thickness. Toner contacting surfaces include, for example, the surfaces of the photoconductive element or insulative member, the intermediate transfer member and the fuser member. The surfaces must be smooth and of uniform thickness to provide for transfer of all the toner from one member to the next or from one member to a receiver without leaving relief marks in the final toner image of a nonuniform surface from which the toner was transferred.

Many transfer materials are known in the prior art for the surface layers of the members in an electrostatographic machine. The most common are silicone rubbers, polyurethanes, fluoropolymer resins or fluoroelastomers. See, for example, U.S. Pat. Nos. 3,893,761; 4,453,820; 3,923,392; 4,455,079; 4,068,937; or 3,697,171 which disclose specific examples of suitable materials.

Commonly, electrostatographic rollers are constructed of a core onto which the layers of polymers, such as silicone rubber, polyurethane, or fluoroelastomers, are compression molded and then ground to achieve a closer approximation to a cylinder. There are mechanical deficiencies associated with this approach, in that the compression molding leads to non-uniform thickness and the grinding imparts a surface roughness, which results in a visible pattern in the transferred toner image. For very high image quality, coated members having very uniform thickness and very smooth surface texture are desired.

Electrostatographic belts have been made by solvent-coating or extrusion-coating a polymeric sheet cutting to size and splicing the ends together. Solvent-coating is undesirable, because the capture of the evaporating solvent is difficult. Extrusion-coating is undesirable, because it does not produce belts having smooth coatings of precise thicknesses without additional grinding steps.

Therefore, there is a need in the art for methods of making parts which provide belt or roller surfaces which are very smooth and of uniform thickness.

SUMMARY OF THE INVENTION

The invention provides methods of centrifugal casting which involve the steps of: adding film-forming polymeric material to a centrifugal apparatus; centrifuging the polymeric material until it is cast; removing the cast polymeric material from the centrifugal apparatus; and mounting the cast polymeric material to a support whereby the air interface side of the polymer is furthest from the outside surface of the support.

These methods can be used to provide polymeric coatings for electrostatographic cast members. The polymeric coatings have smooth surfaces of uniform thickness that do not require grinding. For charged electrostatographic cast members, the uniform surface provides a uniform charge resulting in uniform transfer of the toner particles. The smooth surface provides final toner images which do not have relief marks of the surfaces from which the toner was transferred. These characteristics are particularly important when smaller toner particles are used.

DESCRIPTION OF THE INVENTION

This invention provides methods of forming smooth polymer coatings of uniform thickness most preferably for use on electrostatographic cast members, but the methods can be used to provide smooth coatings for mounting onto a support for other purposes such as conveyor belts and rollers.

The methods involve the steps of: adding a film-forming polymeric material to a centrifugal apparatus; centrifuging the polymeric material until it is cast; removing the cast polymeric material from the centrifugal apparatus and mounting the cast polymeric material to a support whereby the air interface side of the cast polymeric material is the toner-contacting or outside surface of the support.

The product of the method of the invention, a cast polymeric material mounted on a support is referred to herein as a "cast member."

The term "electrostatographic cast member" is used herein to refer to a product of the invention that acts as a belt, plate or roller or any part of an electrostatographic machine which contacts toner, which is charged to a potential, or which would otherwise benefit by having a uniform or smooth polymeric surface. The "electrostatographic cast member" includes the cast polymeric material mounted over a support. A specific example of an electrostatographic cast member is an electrostatographic cast belt which can consist of rollers onto which is directly or indirectly mounted a metal or polymeric belt which either partly of wholly consists of centrifugally cast polymeric materials. Another specific example is an electrostatographic cast roller which consists of a core usually made of metal and a directly or indirectly mounted cast polymeric material.

The term "cast" is used herein to describe the film-forming polymeric material after it has been hardened enough around the periphery of the cylindrical cavity or drum of the centrifugal apparatus so that it will not permanently deform upon removal from the centrifugal apparatus. The term "cast" is also used as a verb to mean the act of hardening the casted polymeric material while it is centrifuged. Typically, the cast polymeric material when hardened in the centrifugal apparatus obtains a cylindrical shape like a sleeve; therefore, the cast polymeric material may be referred to as a "sleeve". Depending upon the type of polymeric material, further steps may need to be taken to complete the hardening process after removing the cast polymeric material from the centrifugal apparatus. The hardening process may require, for example, high temperature cure in an oven, evaporation of solvent, or a crosslinking reaction.

The term "air interface side" is used herein to refer to the side of the cast polymeric material which did not contact any surface of the centrifugal apparatus while the polymeric material was cast in the centrifugal apparatus.

The term "support" is used herein to mean the part onto which the cast polymeric material made by the method of this invention is directly or indirectly mounted. Examples of such supports include a single roller core, several cores, a belt, or a plate.

The polymeric material which is added to the centrifugal apparatus can consist of any film-forming polymeric material known to be useful as the surface layer or other layers of a cast member. (The term polymeric material is used herein, but monomeric materials, especially those that form cast polymeric materials during the centrifuging step are included in the method of this invention.) For electrostatographic cast members examples of polymeric materials include silicones, such as polymethylsiloxanes and polymethylphenylsiloxanes; fluoroelastomers, such as copolymers of vinylidene-hexafluoropropylene and vinylidene-hexafluoropropylene-tetrafluoroethylene; fluoropolymer resins, such as polytetrafluoroethylene, polyfluorinated ethylenepropylene and perfluoroalkoxyhexafluoropropylene; and polyurethanes. Examples of useful polymeric materials include those disclosed in U.S. Pat. Nos. 2,807,233; 3,520,604; 3,702,482; 3,781,105; 3,959,574; 4,257,699; 4,264,181; 4,430,406; 4,729,925; 4,742,941; 4,810,564; 4,853,737; 4,910,559; 5,035,950; and 5,200,284, which are incorporated herein by reference.

The cast polymeric material can consist of a single polymeric material, layers of different polymeric materials or a mixture of polymeric materials in a single layer or multiple layers. The polymeric materials can also consist of polymeric material mixed with non-polymeric materials. Also, non-polymeric materials can be cast as separate layers. The cast polymeric materials can be crosslinked, non-crosslinked, interpenetrating networks or mixtures of one or more of those polymer networks. The cast polymeric materials can contain fillers, crosslinkers, antistats, pigments, plasticizers, conductivity agents, antiozonants, fungicides, dyes, reactive dyes and moisture scavengers. Useful materials for these purposes are well known to a person of ordinary skill in the art. Additional information on useful polymeric materials can be found in U.S. patent Ser. No. 122,754, filed Sep. 16, 1993; U.S. patent Ser. No. 940,582, filed Sep. 4, 1992; and U.S. patent Ser. No. 164,280, filed Dec. 9, 1993, and all incorporated herein by reference.

Non-polymeric materials which can be added to the polymeric material or coated as an additional layer between polymeric material layers include metals and metallic fillers, and other inorganic materials, such as glass and silica. The metal layers can be coated from metal solutions or dispersions. Conductive layers, for example, metal layers or metal-containing layers may be required depending on the final use of the cast member. Conductive layers can be used to provide the proper amount of thermal or electrical conductivity to the cast member. In an example of a particular embodiment of the invention, the polymeric material consists of approximately 8 percent by weight of the filler on a 100 percent total solids weight basis.

The polymeric materials used in the method of this invention depend on the final use of the cast member. Silicone polymers and fluoroelastomers are currently preferred for electrophotographic cast members used as fuser rollers or belts. Polydimethylsiloxanes and polydiphenylsiloxanes are currently more preferred for cast fuser rollers or belts.

Polyurethanes, particularly thermoset and thermoplastic polyurethanes are currently preferred for the polymeric material layers or multi-layers of the electrostatographic cast members used as intermediate transfer rollers or belts. Examples of thermoset polyurethanes include Conathane™ TU-400 and Conathane™ TU-500 both available from Conap, Inc. Examples of thermoplastic polyurethanes include Permuthane™ U6729 and Permuthane™ U10086 available from Stahl Finish. Examples of useful polyurethane coatings are disclosed in U.S. Pat. Nos. 3,959,574; 5,011,739; 5,156,915; 5,212,032; 5,217,838; 5,259,989; and 5,259,990; which are incorporated herein by reference. The polyurethanes may include the additional addenda described earlier. Preferably antistats are incorporated into the polyurethanes to give a volume resistivity of $1 \times 10^5$ to $1 \times 10^{13}$ ohms-cm, more preferably from $1 \times 10^7$ to $1 \times 10^{11}$ ohms-cm. Examples of antistats include quaternary ammonium salts and phosphonium salts. Particular examples of useful antistats are disclosed in U.S. Pat. Nos. 5,212,032; 4,729,925; and 4,742,941 which are incorporated herein by reference.

Multiple layers of the polymeric materials can be used to form the centrifugal cast polymeric material. For some materials, such as between two layers of thermoset polyurethanes, a known primer such as Conap PR 1167™ can be used. Typical primers are siloxane coupling agents. For some multiple layered casts, the additional polymeric materials can be added prior to completely casting the first polymeric material.

The centrifugal apparatus useful in this invention can be any known centrifugal apparatus as long as it has a cylindrical drum for receiving the film-forming polymeric material and provides enough revolutions per minute (RPM), typically greater than 50 RPM, to form a uniform layer of cast polymeric material around the periphery of the cylindrical wall of the centrifugal apparatus. During the centrifuging step, the film-forming polymeric materials are usually in liquid form or are a solid dispersed in a solvent. During the centrifuging step, the liquid polymeric materials harden into cast polymeric material as the result of, for example, cross-linking reactions, solvent evaporation, catalytic reactions, or high temperature cure. Therefore, depending upon the materials to be cast, the centrifugal apparatus must withstand heating to temperatures between 30° C. and 750° C., because some polymeric materials such as polyurethanes and silicones must be high-temperature cured during casting. Also, depending upon the polymeric materials and how they are going to be mounted to the support, it may be beneficial to partially cure the polymeric materials in the centrifugal apparatus and complete the cure when the core, or other support is in contact with the semi-cured cast polymeric material.

The polymeric material is added to the centrifuge usually when the centrifuge is spinning slowly and then the revolutions per minute are increased. The polymeric material is cast against the periphery of the cylindrical wall of the centrifugal apparatus. Depending upon the polymeric material to be cast, the wall of the centrifugal apparatus may need to be coated with a non-adhesive material to keep the polymeric material from adhering to the wall of the centrifugal apparatus. Non-adhesive materials include silicone oils or tetrafluoroethylenes. Examples of commercially available materials include Conap™ MR 5002 available from Conap, Inc., and Teflon™ available from DuPont.

When the polymeric material is cast against the cylindrical wall of the centrifugal apparatus the resulting sleeve must be turned inside out before mounting onto a support to make the air-interface side of the sleeve the outside surface of the cast member. For an electrostatographic cast member, the outside surface can be the toner contacting surface or the charge bearing surface. The sleeve can be turned inside out or it can first be cut and then turned inside out. An uncut sleeve can be mounted on any shape support. For example, the sleeve can be pressure-fitted onto the core by stretching the sleeve to fit a core with a larger outside diameter than the inside diameter of the sleeve. The core is preferably primed with primer, adhesives or conductive adhesives prior to pressure fitting the sleeve to provide good adhesion of the sleeve to the core. If the sleeve has been cut it can be mounted on a plate, belt, core, or drive rollers for example by using adhesives, conductive adhesives, primers, clamps, or other mechanical means, or by fastening the cut ends together to create a seam and pressure fitting the sleeve onto a support. Additional means will be described below which are adaptable to adhering the cut or uncut sleeve to the core.

Alternatively, the polymeric material can be cast against a base. The base can be loaded into the centrifugal apparatus so that the base lines the cylindrical wall of the centrifugal apparatus against which the polymeric material is cast. The base can be, for example, a metal belt or sheet, or a polymeric belt or sheet. The base can be a non-adhesive material from which the cast polymeric material can later be removed or it can be a material to which the polymeric material adheres. It is preferred that the cast polymeric material adheres to the base as a result of the centrifuging step, and that the base can be used to mount the base with the adhered cast polymeric material to the support. If desired, mechanical means can also be used to attach the cast polymeric material to the base. The base with the cast polymeric material attached or adhered to it will be referred to as a "mask."

The base material for the mask can be any material which provides a critically dimensionally stable base which can be mounted onto a support. The term "critically dimensionally stable" as used to describe the base material means that the material possesses a Youngs Modulus greater than 0.27 MPa, more preferably it possesses a Youngs Modulus greater than $4.8 \times 10^4$ MPa, and most preferably it possesses a Youngs Modulus greater than $6.9 \times 10^4$ MPa. It is preferred that the base material be substantially incompressible, and that the base material possesses a thermal coefficient of expansion at 100° C. less than 200 µm/°C., more preferably a thermal coefficient expansion at 100° C. less than 12 µm/m°C. It is preferred that the base material has a surface roughness of greater than 1µ inch and less than 500µ inches, more preferably greater than 100µ inches and less than 250µ inches to improve adhesion between the base and the polymeric material.

The base material can be metallic, polymeric, polymeric-metallic, ceramic, glass, fiberglass, or natural and artificial fabrics or mixtures of these materials. Examples of polymers which can be used as the base material include polyimides, such as Kapton™ available from E. I. dupont de Nemours and Co., polyarylsulfones, polyamideimides, high temperature nylons and certain aromatic copolyesters such as Estar™, available from Eastman Kodak Co., and Ekkcel™ available from Carborundum. The base can consist of a metal such as aluminum, anodized aluminum, steel, stainless steel and nickel. Generally, the thickness of the base is preferably between 0.0005 inch and 0.250 inch. The preferred base material for the mask is metal. For a metal base, the thickness of the base is preferably between 0.005 and 0.250 inch.

The base material can be cast in the centrifugal apparatus first and then the additional polymeric materials can be cast onto it, or the base material can be pre-made and inserted into the centrifugal apparatus.

The base can be any shape including rectangular, square, trapazoidal, or cylindrical as long as the mask covers the working surface, such as the toner or charge receiving surface of an electrostatographic plate, belt or roller or other support onto which the mask is mounted. The preferred shape of the base is substantially rectangular having a length and width approximately equivalent to the length and the width or circumference, respectively, of the support onto which the base will be mounted. However, the actual dimensions of the base will also depend upon the means for mounting the mask onto the support. The presently preferred embodiment is to wrap the mask around a core; therefore, the preferred base is a flexible rectangular sheet of anodized aluminum which can be wrapped smoothly around the core.

Usually prior to placing the base into the centrifugal apparatus, the base is cleaned and primed with an appropriate primer, adhesive or conductive adhesive for the polymeric material which is to be adhered to the base. The primer or adhesive may vary depending upon the polymeric material to be applied to the base. Examples of primers include silane coupling agents, such as Conap™ AD-1147, polyamides, polyimides, polyamideimides, epoxy resins, benzoguanamineformaldehyde resin crosslinker, epoxy cresol novolac, dianilinosulfone crosslinker, and polyphenylene sulfide polyether sulfone. Once the base is cleaned and primed, it is placed along the cylindrical wall of the centrifugal apparatus so that the primer layer faces inwardly to receive the polymeric material.

Depending upon the size and flexibility of the base and cast polymeric material, the resulting mask can be turned inside out without having to cut the mask thereby turning the air interface side of the mask outward. Then, a support such as a core, multiple drive rollers, or belt supports can be inserted into the mask to form a roller or belt having a cast polymeric material surface layer. Typically, this is accomplished by pressure-fitting, which requires stretching the mask to fit around the core, roller, or belt support, but it can additionally or alternatively be accomplished by mechanical attachments between the mask and the support. Several mechanical attachments will be described below.

If the mask is not flexible enough to turn inside out, it can be cut before turning inside out and then mounted onto a support, such as a plate, a core, or drive rollers. The means for mounting the mask onto the support can consist of hooks, latches, grips, clamps, clasps or the like, or combinations of the above on the support or mask which fit into holes, indentations, slots, receivers or the like, or combinations of the above on the mask or support, respectively. Alternatively, the support and/or the mask can have holes, which can be threaded to receive screws or bolts. The mask can also be mounted onto the support with adhesives. Additionally, the base of the mask can be grooved on the side that does not have any polymer coating on it and the support can be grooved so that the two sets of grooves fit or slide into each other. The base of the mask can be made with clasps or holes on both ends or edges that can be locked into each other or tied together when the mask is mounted onto the support. The circumferential ends of the support can have clamps, braces, or separate rims that receive the mask or fit over the circumferential ends of the mask to hold the mask to the support.

One preferred method of mounting a mask onto a core is to provide holes in two opposite edges of the mask and a gully in the core having hooks on one side which fit into the holes in one edge of the mask, and latches on the second side of the gully which fit through the holes in the other edge of the mask and pull the mask taut when closed. The gully can be made narrow enough so that only the ends of the mask fit into the gully thereby providing a continuous or almost continuous polymeric surface to a roller. Alternatively, the gully can be broader than the thickness of the edges of the mask. When the gully is broader than the thickness of the edges of the mask inserted into the gully, the roller is preferably cantilevered from and into contact with toner images.

Another preferred embodiment of mounting a mask onto a core is to provide holes in two opposite edges of the mask and threaded holes in both sides of a gully in the core. When the mask is wrapped around the core, the holes in the edges of the mask line up with the threaded holes in the gully. A plate having holes which are also in line with the holes of the gully and mask is placed over each edge of the mask and bolts or screws are screwed into the core holding the plate and mask to the core.

A third preferred embodiment of mounting a mask onto a core is to provide holes in two opposite edges of the mask and a couple of clamping mechanisms which are mounted onto the core, each clamping mechanism having a strip of holes. The strip of holes in the clamping mechanism line up with the holes in the mask and bolts or screws through the two sets of holes hold the mask to the clamping mechanism. The clamping mechanisms are attached to the core via bolts. At least one of the clamping mechanisms is held in a slidable relationship with the core which is accomplished by bolts through slots in the clamping mechanism anchored in the core. Springs are mounted to one or both of the clamping mechanisms and the core to hold the mask taut.

If the sleeve or mask produced is to consist of multiple layers of polymeric or non-polymeric materials, one or more of the layers can be formed by other coating or forming methods, such as, spray-coating, extrusion-molding or compression-molding. The preformed layers can be placed in the centrifugal apparatus and the last layer or layers can be centrifugally cast onto the other polymer layers. The polymer layer or layers can have a total thickness between 0.01 and 5 inches, more preferably 0.01 to 1 inch, most preferably 0.05 to 0.5 inch. The centrifugally cast layer preferably provides a surface roughness of 1µ inch to 100µ inches.

Alternatively, an additional polymeric layer can be applied to the cast polymeric material either before mounting the cast polymeric material onto the support or after mounting the cast polymeric material onto the support. The polymeric material includes any of those previously described herein and release oils, such as silicone oils. The polymeric materials can be applied by any method, for example, spray-coating, compression-molding, injection-molding, or ring-coating; however, the benefits of the centrifugal casting method may be lost if a thick layer, for example greater than 100µ inches, of polymeric material is applied over the cast polymeric material.

The following example illustrates the method of the invention by which an electrostatographic cast member is made by centrifugally casting a polymeric material onto a base to form a mask and then mounting the mask onto a core to form an intermediate transfer cast member. Further details of this embodiment of the invention are described in U.S. patent application Ser. No. 08/338,923 filed concurrently herewith, and incorporated herein by reference.

EXAMPLE

Preparation of an Intermediate Transfer Roller Having a Roller Mask

Preparation of the Aluminum Base:

A 0.01 inch thick and 13.25 inch wide aluminum sheet anodized on one side was cut to a length of 20 inches. The anodized aluminum was cleaned with acetone and the first 1 inch of two opposite edges was treated with a silicone release agent, Conap™ MR 5002. The remaining anodized portion was treated with a solution of 10 grams polyurethane primer, Conap™ AD 11457, and 20 grams toluene/isopropanol (1:1). The Conap™ products were supplied by Conap, Inc. The primer was applied witch a lint free cloth and was dried at room temperature for one hour. The metal base was placed in the cylindrical cavity of the centrifugal apparatus with the primed anodized aluminum surface facing inward. The edges were joined with Kapton™ tape supplied by DuPont.

Casting a Polyurethane Layer:

In a plastic beaker 0.316 grams of an antistat made according to Example 1 of U.S. Pat. No. 5,212,032, incorporated herein by reference; 32.85 grams Voranol™, which is a trimethylol propane base crosslinking agent supplied by Dow Chemical; several drops of SAG 47™, which is a surfactant supplied by Union Carbide; and 615.16 grams L42™, which is a TDI endcapped polyether based resin supplied by Uniroyal, were stirred with a metal spatula. 1.98 Grams EC-300™, which is a diamine chain extender supplied by Ethyl Corp., was added and the mixture was again stirred with a metal spatula for 5 minutes. The residual air was removed from the mixture under reduced pressure (0.01 mmHg). The mixture was poured into the centrifugal apparatus at room temperature while the cylindrical drum was spinning at ~500 rpm. After pouring the mixture into the cylindrical drum, the spinning was increased to 1700 rpm, and the temperature was increased to 80° C., and both the temperature and the spinning rate were maintained for sixteen hours to cast the polymeric material.

Casting of an Overcoat Layer:

The centrifugal apparatus, while still spinning, was allowed to cool to room temperature. In a separate plastic beaker, 31.25 grams toluene and 31.25 grams propyl alcohol were added to 3.0 grams Permuthane™ supplied by Stahl Finish. This solution was poured into the centrifugal drum spinning at 1700 rpm. The centrifugal drum spun at 1700 rpm for 90 minutes. The mask was removed by cutting the polyurethane along the Kapton™ seam.

Mounting the Mask on the Core:

The mask had a 0.1 inch thick total polyurethane coating. The polyurethane coating was removed from one inch of the two opposite edges of the base. Both edges were perforated with a lithoplate punch. The holes on the edges had 0.15 inch outside diameters and were located 1 inch a part.

The mask was mounted on a core. The core had an approximately 4 inch wide tangential gully running almost the length of the core. In the gully there were two clamping mechanisms having attached strips of holes. The clamping mechanisms were bolted to the core through slots in the clamping mechanisms which allowed for slideable movement of the clamping mechanisms in relationship to the core. The base was attached to the clamping mechanism by putting screws through the holes in the base and holes in the strips of holes in the clamping mechanisms. One of the clamping mechanisms had springs attached to it and to the core to hold the mask taut around the core.

This roller having the attached mask was tested as an intermediate transfer roller in a laboratory model test copier. The copier produced high image quality copies.

The invention has been described in detail with particular reference to certain preferred embodiments thereof, but it should be understood that variations and modifications can be effected within the spirit and scope of the invention.

We claim:

1. The method of making a cast member comprising the steps of:

adding a film-forming polymeric material to a centrifugal apparatus; centrifuging said polymeric material until said polymeric material is cast into a cylindrical shape; removing said cast polymeric material from said centrifugal apparatus; and mounting said cast polymeric material to an outside surface of a support, whereby the smooth air interface side of said cast polymeric material is furthest from said outside surface of said support.

2. The method of claim 1 further comprising the step of heating said centrifugal apparatus during said centrifuging step.

3. The method of claim 1 further comprising the step of putting a base into the centrifugal apparatus prior to said adding step.

4. The method of claim 3 further comprising the steps of cleaning and priming said base prior to said putting step.

5. The method of claim 1 further comprising the step of cutting said cast polymeric material down a seam prior to said removing step.

6. The method of claim 1 wherein the mounting step comprises using adhesive.

7. The method of claim 1 wherein said mounting step comprises using bolts.

8. The method of claim 1 wherein said polymeric material is selected from the group consisting of polyurethane, fluoroelastomer, fluoropolymer resin, and silicone rubber.

9. The method of claim 1 further comprising the steps of forming an additional polymeric material by a method selected from the group consisting of extrusion-molding, spray-coating, ring-coating and compression-molding; and putting said additional polymeric material into the centrifugal apparatus prior to said adding step.

10. The method of claim 1 whereby said surface roughness of said air interface side of said cast polymeric material is less than 100µ inches.

11. The method of forming electrostatographic cast member comprising the steps of: adding a polymeric material to a centrifugal apparatus; centrifuging said polymeric material until said polymeric material is cast into a cylindrical shape; removing said cast polymeric material from said centrifugal apparatus; and mounting said cast polymeric material to an outside surface of a support of an electrostatographic member whereby the smooth air interface side of said cast polymeric material is furthest away from said outside surface of said support.

12. The method of claim 11 whereby said electrostatographic cast member is selected from the group consisting of fuser rollers, fuser belts, intermediate transfer rollers, intermediate transfer belts, electrostatographic drums, and electrostatographic belts.

13. The method of claim 11 further comprising the step of heating said centrifugal apparatus during said centrifuging step.

14. The method of claim 11 further comprising the step of coating said cast polymeric material with an additional polymeric material.

15. The method of claim 12 further comprising the step of putting a base into the centrifugal apparatus prior to said adding step.

16. The method of claim 11 further comprising the step of cutting the cast polymeric material down a seam prior to said removing step.

17. The method of claim 11 wherein said polymeric material is selected from the group consisting of polyurethane, fluoroelastomer, fluoropolymer resin, and silicone rubber.

18. The method of claim 11 further comprising the steps of coating a polymeric material onto a base by a method selected from the group consisting of extrusion-molding, spray-coating, ring-coating and compression-molding; and putting said base coated with said polymeric material into the centrifugal apparatus prior to said adding step.

19. The method of claim 11 whereby said surface roughness of said air interface side of said cast polymeric material is less than 25µ inches.

20. The method of claim 11 whereby said surface roughness of said air interface side of said cast polymeric material is less than 10µ inches.

* * * * *